(12) United States Patent
Rangoni et al.

(10) Patent No.: US 10,316,910 B2
(45) Date of Patent: Jun. 11, 2019

(54) METHOD OF OBTAINING A BACKING PLATE FOR A BRAKE PAD AND BACKING PLATE THUS OBTAINED

(71) Applicant: UTIL INDUSTRIES S.P.A., Villanova d'asti (AT) (IT)

(72) Inventors: Francesco Rangoni, Villanova d'asti (IT); Raffaele Gabriele Vironda, Villanova d'asti (IT); Rodolfo Pizzio, Villanova d'asti (IT)

(73) Assignee: Util Industries S.p.A., Villanova d'asti (at) (IT)

( * ) Notice: Subject to any disclaimer, the term of this patent is extended or adjusted under 35 U.S.C. 154(b) by 86 days.

(21) Appl. No.: 15/309,250

(22) PCT Filed: May 22, 2015

(86) PCT No.: PCT/IB2015/053790
§ 371 (c)(1),
(2) Date: Nov. 7, 2016

(87) PCT Pub. No.: WO2015/181695
PCT Pub. Date: Dec. 3, 2015

(65) Prior Publication Data
US 2017/0067521 A1     Mar. 9, 2017

(30) Foreign Application Priority Data

May 30, 2014   (IT) .............................. TO2014A0436

(51) Int. Cl.
*F16D 69/04* (2006.01)
*F16D 65/092* (2006.01)
*F16D 65/095* (2006.01)

(52) U.S. Cl.
CPC ......... *F16D 65/095* (2013.01); *F16D 65/092* (2013.01); *F16D 69/0408* (2013.01);
(Continued)

(58) Field of Classification Search
CPC .... F16D 65/095; F16D 65/092; F16D 69/048; F16D 69/04; F16D 2069/0425; F16D 2069/0441; F16D 2069/0483
(Continued)

(56) References Cited

U.S. PATENT DOCUMENTS 4,991,697 A   2/1991 Hummel et al.
6,431,331 B1  8/2002 Arbesman
(Continued)

FOREIGN PATENT DOCUMENTS

| CN | 2906201 Y | 5/2007 |
| CN | 201011369 Y | 1/2008 |
| EP | 1691103 A1 | 8/2006 |

*Primary Examiner* — Pamela Rodriguez
(74) *Attorney, Agent, or Firm* — Howson & Howson LLP

(57) ABSTRACT

Method of obtaining a backing plate (11) for a brake pad (13), comprising the steps of: providing a band (113) of a material suitable for the making of the backing plate (11); carrying out, on the band (113), the blanking of the backing plate (11) so as to define, on the backing plate (11), a front surface (11a) and a back surface (11b) essentially parallel to each other, the flat front surface (11a) being adapted to receive a layer of friction material; carrying out, on the band (113), the coining of a plurality of engagement recesses (19) on the front surface (11a); characterized in that the engagement recesses (19) are distributed over the front surface (19a) in a non-uniform way and in accordance with a predetermined pattern.

10 Claims, 12 Drawing Sheets

(52) U.S. Cl.
CPC ............... *F16D 2069/0441* (2013.01); *F16D 2069/0483* (2013.01)

(58) Field of Classification Search
USPC .... 188/250 G, 250 R, 253, 258, 259, 251 A, 188/251 M
See application file for complete search history.

(56) References Cited

U.S. PATENT DOCUMENTS

| | | |
|---|---|---|
| 7,686,142 B2 | 3/2010 | Jung |
| 2004/0238295 A1 | 12/2004 | Pham |
| 2005/0161297 A1 | 7/2005 | Uwaydah |
| 2006/0260888 A1 | 11/2006 | Pham |
| 2011/0220441 A1 | 9/2011 | Zhang |
| 2013/0277159 A1* | 10/2013 | Borgmeier ............ F16D 65/092 188/234 |
| 2016/0281811 A1 | 9/2016 | Pizzio et al. |

* cited by examiner

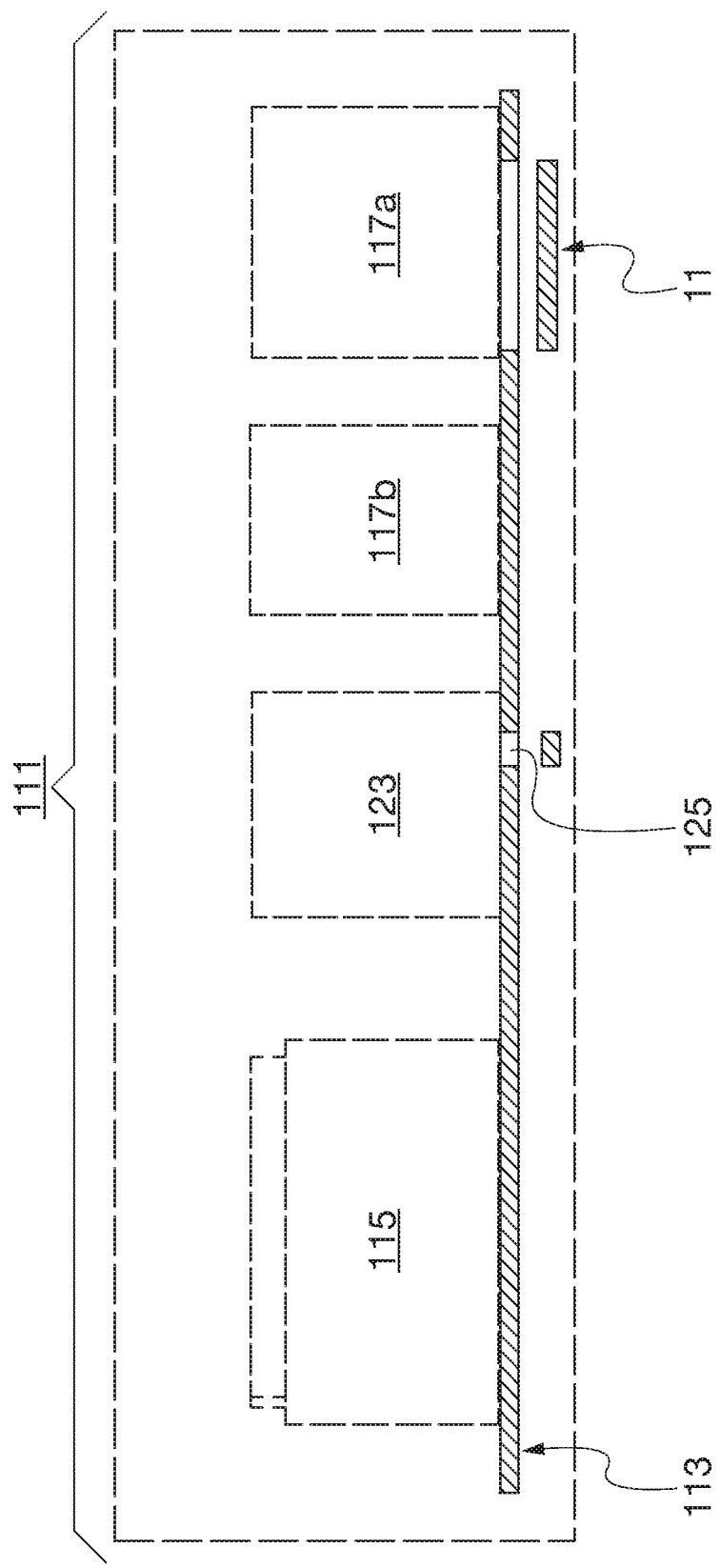

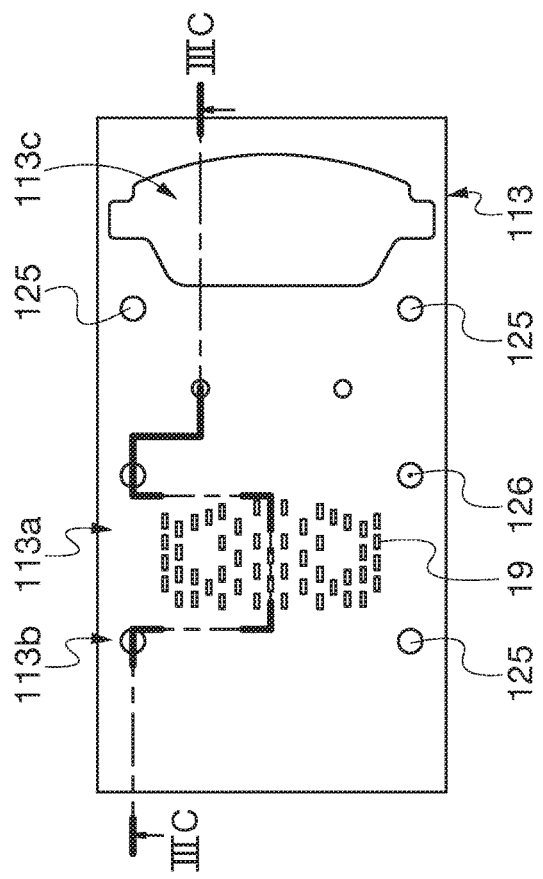
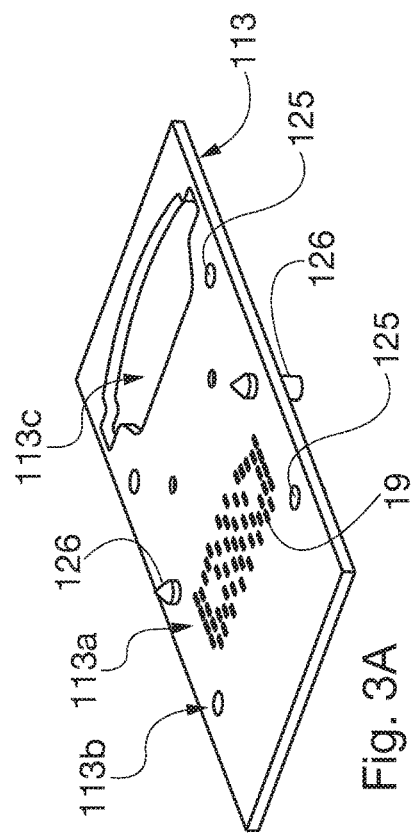
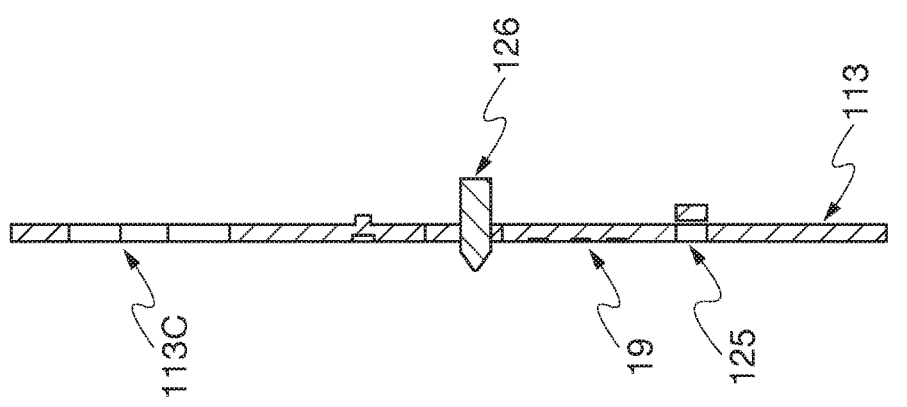

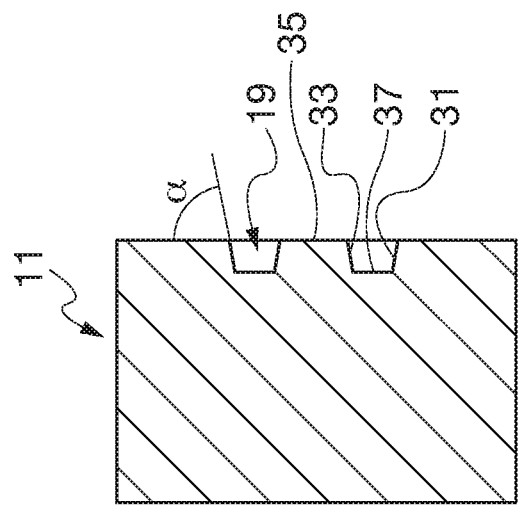
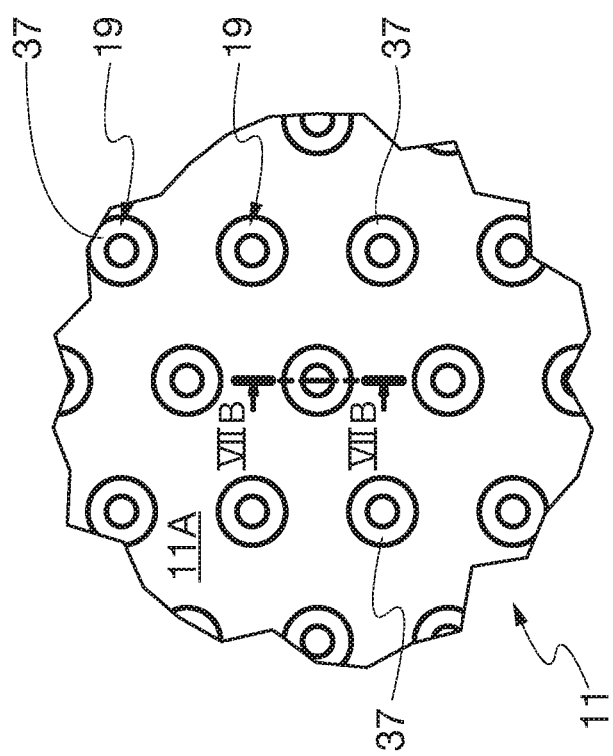

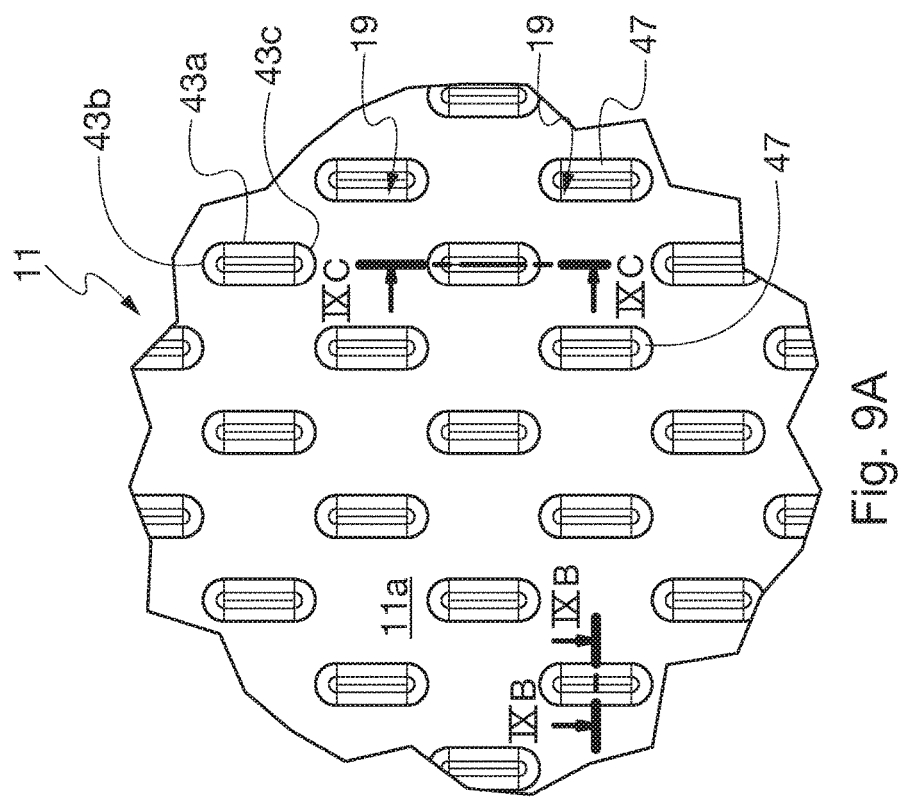
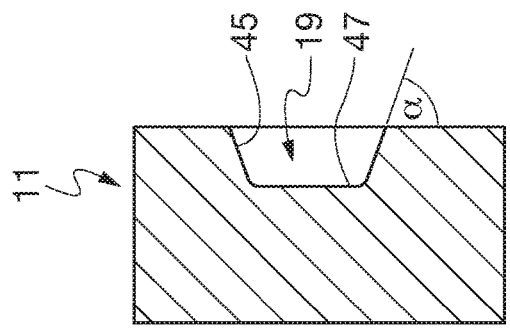
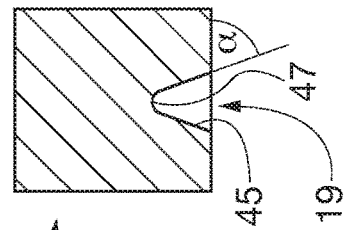

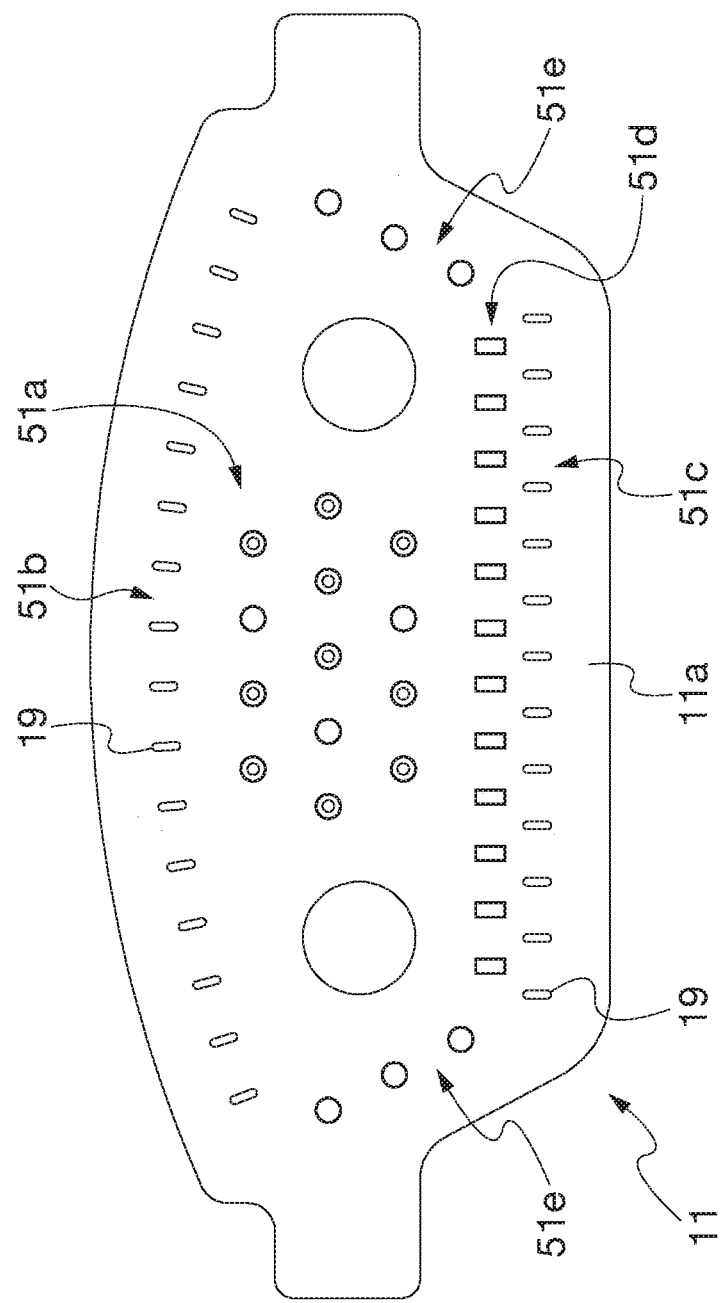

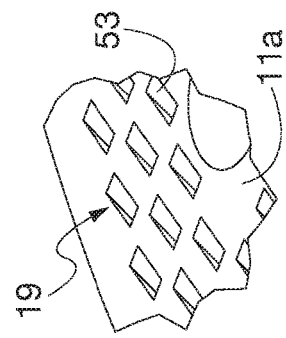
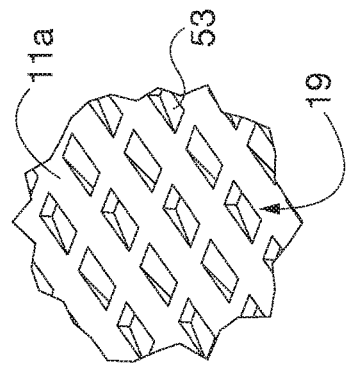
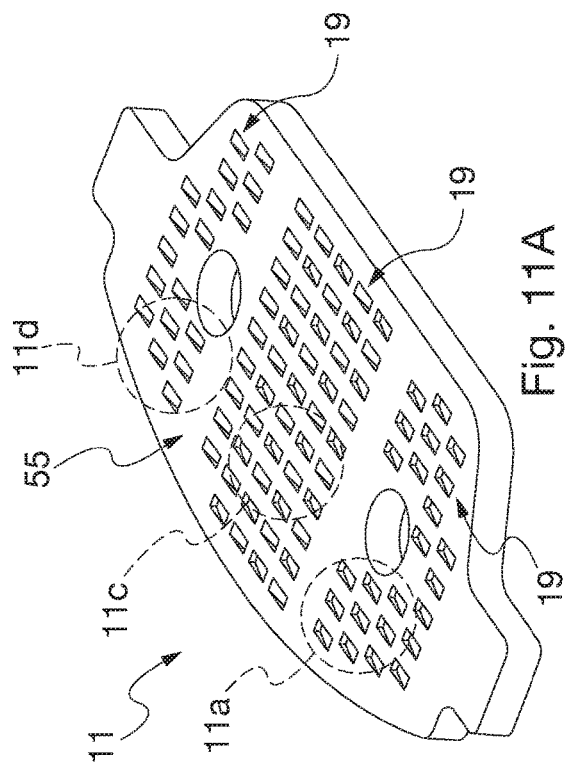
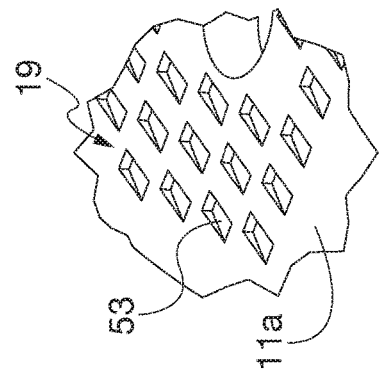

METHOD OF OBTAINING A BACKING PLATE FOR A BRAKE PAD AND BACKING PLATE THUS OBTAINED

TECHNICAL FIELD

The invention relates to a method of obtaining a backing plate for a brake pad. The invention further relates to a backing plate of a brake pad obtained by this method.

BACKGROUND ART

A brake pad for a disc brake comprises a backing plate having a back surface and a front surface essentially parallel to each other. A layer of friction material is adhered to the front surface. The friction material is applied to the front surface of the backing plate, at a predefined engaging portion which usually takes up most of the area available on said front surface. This engaging portion of the backing plate is further surrounded, without interruption, by a free peripheral zone, i.e. a zone intended not to be covered with the friction material. The peripheral zone, free of friction material, is necessary mainly for working requirements. The width of the free zone is usually kept to the bare minimum, as it is disadvantageous, mainly for reasons of weight, that the total area of the front surface of the backing plate is greater than the effective area for the braking effect. The minimum width of this free zone, usually measured along the longitudinal flanks of the backing plate, can vary from some tenths of millimeter to some millimeters.

During operation of a brake assembly, i.e. during braking, the brake pad is brought against the disc along a direction substantially perpendicular to the rotating surface of the disc. During braking the layer of friction material with which the brake pad is provided is exposed to forces that are mainly tangential with respect to the circular motion of the disc. Said tangential forces develop in the plane of the brake pad parallel to the disc and tend to remove the friction material by tearing it away from the back plate. During braking, in addition to these tangential forces, there are also other forces that are directed in several directions. Particularly, there are forces that are perpendicular to the surface of the brake pad and are caused by vibrations. Vibrations are generated during action of the brake pad on the disc, for instance as a consequence of possible alignment errors of the parts in relative motion. Furthermore, part of the kinetic energy of the disc turns into heat during braking. The heat thus generated usually causes an increase in the temperature of the materials of which the brake pad is made. The increase in temperature may cause weakening of the bonds that hold the friction material on the backing plate, with a consequent risk that said material becomes detached. The greater the braking action to be exerted by the brake assembly onto the rotating disc is, the stronger the forces acting on the friction material during braking are. When such forces overcome the counter-forces holding the fiction material adhering to the back plate, detachment and destruction of the friction material or of part thereof occur, thus causing jeopardy to or loss of the braking effect.

One of the problems to be solved in the making of a brake pad is therefore that of how to prevent detachment of the friction material during use. Some solutions are known in the art in order to promote adhesion of the friction material to the backing plate.

A first solution to the aforesaid problem provides to make protrusions on the front surface of the backing plate intended for receiving the friction material. During the manufacturing of the brake pad, the friction material is deposited onto the surface of the backing plate. When the layer of friction material is hardened, the protrusions remain embedded in said layer. The protrusions penetrating into the layer of friction material therefore contribute to prevent detachment of the friction material from the backing plate when shear forces, even strong ones, are applied. According to prior art, these protrusions can be obtained by deposition of material, which can be for instance welded to the front surface of the backing plate. U.S. Pat. No. 4,991,697 describes an example of this kind of solution. According to another known solution, the protrusions can also be obtained by material removal from the surface of the backing plate, for instance by means of movable blades. Cutting of the surface of the backing plate by means of movable blades causes partial removal of the material, thus creating corresponding recesses. The material removed by the movable blades is lifted from the surface of the backing plate, but it is not completely detached. The removed material therefore remains lifted, thus creating protrusions or asperities. Each protrusion is associated to a corresponding engagement recess, which, however, is not the main purpose of working with movable blades. The protrusions and the corresponding engagement recesses thus obtained can be distributed in a random manner, as described for instance in EP 1 484 524 A1, or they can be distributed in a uniform manner, as described for instance in U.S. Pat. No. 6,431,331 B1. Another solution to the aforementioned problem provides to make, on the surface of the backing plate, solely engagement recesses, without making any asperities, thus leaving the surface of the backing plate substantially smooth. This solution is described in US 2011/0220441 A1 and provides to make, on the front surface of the backing plate, a regular matrix of engagement recesses having a square cross-section. The engagement recesses are preliminarily made on the band of material from which the backing plate will be subsequently cut away by means of known blanking methods. According to the teaching of this document, the matrix of engagement recesses has a regular shape, which determines a regular distribution of the engagement recesses. Still according to the teaching of this document, it is further provided that the side walls of the engagement recess extend perpendicularly to the surface of the backing plate on which said engagement recesses are made and that the base of the recesses is parallel to the front surface of the backing plate.

The problem of how to prevent the friction material from becoming detached, however, is not effectively solved by known solutions. Indeed, these solutions generically deal with promoting the adhesion of the friction material to any flat surface. However, it has been demonstrated in practice that in a brake pad the problem of the detachment of friction material does not uniformly affect the surface of the brake pad. The results obtained by means of known solutions, moreover, are not constant upon varying of some parameters of the brake pad. The parameters that can influence the behavior of the known solutions are, in particular, the kind of steel of which the backing plate is made, the kind of friction material, the size and shape of the backing plate and the size of the brake disc. The kind of material of which the backing plate is made and the thickness thereof determine for instance the capacity of dissipating heath. The shape of the backing plate and the shape of the disc determine the direction and the intensity of the shear forces applied to the friction material. The granulometry, the density and the binder used in the mixture of the friction material make the methods described above more or less effective depending on the variation of these parameters.

A strong need is therefore felt in the field to solve the problem of how to promote adhesion of the friction material to the backing plate, by avoiding occurrences of detachment, upon variation of these parameters, thus allowing to obtain better and more uniform results upon variation of the kind of brake pad which is manufactured.

The main object of the invention is to solve the problem mentioned above, by providing a method of obtaining a backing plate of a brake pad that improves adhesion of the friction material to the brake pad.

A further object of the invention is to provide a method of the aforesaid kind that is easy and cost-effective to perform and is therefore suitable for being used on a large scale in industry.

SUMMARY OF THE INVENTION

These and other objects are achieved by the method and the backing plate as claimed in the appended claims.

The invention is based on the principle according to which the engagement recesses provided on the surface of the backing plate, if properly distributed, are alone capable of obtaining the desired results without the necessity of providing protrusions or asperities. The absence of protrusions or asperities allows to make the backing plate with a manufacturing process of coining. According to a preferred embodiment of the invention, the engagement surface for the friction material is therefore smooth, i.e. without asperities, except for those microscopic ones due to the usual manufacturing tolerance, and is therefore advantageously easier to use for the subsequent manufacturing steps for obtaining the brake pad. Advantageously, the coining punches can be provided inside the same blanking mold for the backing plate. In this way, subsequent operations of re-machining of the workpiece are avoided, with consequent saving on production costs. The provision of coining punches in the same blanking mold further allows high flexibility in the definition of shapes and in the distribution of recesses. In addition, the change of shapes and of the distribution of recesses and the maintenance of the mold are simplified. Furthermore, an advantage of the method of cutting by coining derives from the possibility of orienting the opening of the engagement recesses in whatever way, unlike the case where movable cutting blades are used, which allow to orient the recesses solely along a single direction of advancing of the movable blades. The adoption of the coining method therefore allows to distribute the engagement recesses over the surface of the backing plate in an optimized and predetermined manner with respect to the applied forces generated by the parameters at stake. Consequently, the backing plate obtained by the method according to the invention will have a non-uniform distribution of the engagement recesses, which follows a predetermined design (pattern). A further advantage of the invention derives from the fact that the engagement recesses are arranged only where it is necessary and with proper density, possibly leaving free some areas of the backing plate, with consequent energy saving, less tool wear and reduced production costs.

BRIEF DESCRIPTION OF THE DRAWINGS

Some embodiments of the invention will be given by way of non-limiting examples with reference to the attached drawings, in which:

FIG. 2 is a layout of a mold in a preferred embodiment of the manufacturing method according to the invention;

FIG. 3A is a top perspective view of a band strip from which the back plate is obtained according to a first embodiment;

FIG. 3B is a top view of the strip of FIG. 3A;

FIG. 3C is a sectional view taken along the line IIIC-IIIC of FIG. 3B;

FIG. 7A is a plan view of a backing plate portion provided with circular crown-like engagement recesses;

FIG. 7B is a section taken along the line VIIB-VIIB of FIG. 7A;

FIG. 9A is a plan view of a backing plate portion provided with slot-shaped engagement recesses;

FIG. 9B is a section taken along the line IXB-IXB of FIG. 9A;

FIG. 9C is a section taken along the line IXC-IXC of FIG. 9A;

FIGS. 10A to 10E are plan views of as many embodiments of the backing plate;

FIG. 11A is a perspective view of a backing plate of a further embodiment of the invention;

FIGS. 11B, 11C, 11D are enlarged view of as many portions of FIG. 11A.

DESCRIPTION OF SOME PREFERRED EMBODIMENTS

Figure 6A:
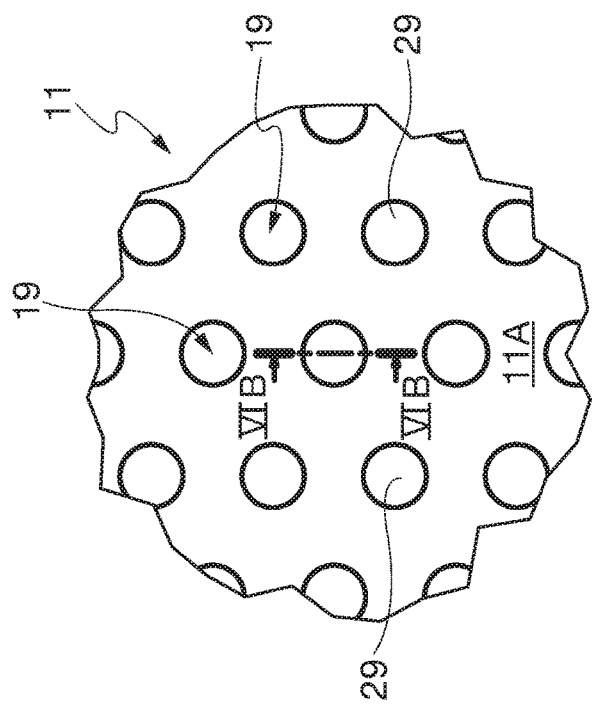
FIG. 6A is a plan view of a backing plate portion provided with circular engagement recesses.

Referring to FIGS. 1 to 5, the method according to the invention for obtaining a backing plate 11 for a brake pad 13 will be described. The method according to the invention provides the use of a mold 111. Said mold 111 can be of the traditional type for blanking of a backing plate 11 from a band 113 of suitable material. A material suitable for the making of a backing plate 11 is typically steel. Still according to the invention, said mold 111 can also be of the type known in the field for obtaining a fine blanking.

The method according to the invention provides to carry out at least one coining step and one blanking step. In a preferred embodiment of the invention, the coining and blanking steps are carried out with a single mold 111. In addition, preferably, the mold performs coining and blanking on a band of material 113 which moves forward stepwise thanks to a feeder (not shown). According to this embodiment, on the same mold 111 there is therefore provided a mold portion 115 which performs coining on the band 113 and a mold portion 117a which performs blanking of the coined workpiece from the band 113. A first intermediate mold portion 117b can be provided for performing a pre-blanking on the band 113. In addition, a second intermediate mold portion 123, which makes guiding holes 125 on the band 113, can be provided in the mold 111. These working operations are performed simultaneously by means of the single mold 111 at different portions of the band 113. The band 113 moves forward stepwise for arriving at the subsequent portions of the mold 111. In this way on a same portion of the band 113 coining, blanking and possibly the guiding holes 125 and/or the pre-blanking are made sequentially. The portion of the band 113 on which coining has been performed in one of the preceding steps is blanked and the workpiece thus obtained is removed from the band 113. Still according to this embodiment, it will also be possible to provide that coining takes place in a sequence of coining steps, with punches arranged in different areas of the same mold. For instance each of these areas of the mold can be provided with groups of punches of different kinds. At each advancing step of the band 113, the same band portion is coined sequentially while stopping at the areas of the mold equipped with a different group of punches.

In another embodiment it will be possible to provide that coining and blanking are obtained by means of separate molds.

In a further embodiment it will be possible to provide a single mold that performs coining and blanking simultaneously on the same band portion. In this way, with a single working step, coining is performed and the backing plate is blanked along the perimeter surrounding the area in which coining is simultaneously performed.

According to another embodiment, it can be provided that coining is effected on the backing plate, after the blanking step, in a step of re-machining of the blanked workpiece, by means of a single coining mold or a plurality of coining molds.

According to a preferred embodiment of the invention, coining is effected by means of a mold 111 equipped with a punch-holding block 119 on which blades or punches 121 are mounted. The blades or punches 121 have a shape corresponding to the shape of a corresponding engagement recess 19 to be obtained on the backing plate 11. According to the invention, the engagement recesses 19 obtained by coining will preferably be blind recesses. The punch-holding block 119 is further preferably removable relative to the mold. This allows to replace the block 119 when it is worn or for replacing it with a block having punches capable of obtaining different or differently arranged recesses.

The blanking step allows to obtain, from the starting band 113 of suitable material, the shape of the backing plate with the profile according to the requirements of the brake assembly for which the brake pad 13 is intended. On the backing plate 11 there are thus defined a plan front surface 11a and a plan back surface 11b. The surfaces 11a and 11b are also essentially parallel to each other. In addition, the plan front surface 11a is smooth and is adapted to receive a layer of friction material 21.

The coining step generates a plurality of engagement recesses 19 on the front surface 11a of the backing plate 11. According to the invention, advantageously, the engagement recesses 19 are distributed in a non-uniform way according to a predetermined design (pattern). The distribution and the shape of the engagement recesses 19 is advantageously determined mainly depending on the following parameters: the kind of steel of which the backing plate is made, the kind of friction material intended to be used on the backing plate, the size and shape of the backing plate, the size of the brake disc for which the backing plate is intended.

Furthermore, thanks to the technique of working by coining the recesses 19 can be made with high precision inside the mask of the backing plate on the band 113.

According to a preferred embodiment of the invention, the engagement means for the friction material comprise solely the recesses 19 and do not comprise engagement protrusions or asperities. At the end of the blanking and coining working operations, the front surface 11a of the backing plate 11 is therefore smooth and provided with engagement recesses 19.

Referring to FIGS. 3A to 3C, there is illustrated a strip of band 113 during the carrying out of the method according to a preferred embodiment of the invention. On the strip, the engagement recesses 19 obtained by coining on a first band portion 113a can be seen. Guiding holes 125 are obtained on portions 113b of the band 113. The guiding holes 125 are adapted to receive corresponding guiding pins 126 that are provided, according to prior art, in the working equipment for the purpose of keeping the band 113 firmly aligned with the mold 111. On a portion 113c of the band 113, there can be seen the corresponding opening left by the blanking of the backing plate after this has been removed from the band 113 through known means. The deposition of the layer of friction material 21 onto the backing plate 11 takes place so as to enable the friction material to penetrate deeply into the engagement recesses 19. The friction material is applied according to known techniques that do not form part of the present invention and therefore are not discussed in detail.

The engagement recesses 19 are obtained inside an engaging portion 23 on the front surface 11a of the backing plate 11. The engaging portion 23 corresponds to the portion of said front surface 11a provided for engagement of the layer of friction material 21. Said portion 23 is surrounded, without interruption, by a peripheral zone 25 without engagement recesses. The peripheral zone 25 is indeed intended to remain free of friction material and it is advantageous that it does not have engagement recesses 19. Engagement recesses that are not filled or are only partially filled with the friction material could create cracks and cause detachment of the friction material at the peripheral outer edge of the brake pad. The presence of engagement recesses without friction material further determines accumulation of powder and other materials that might jeopardize proper operation of the brake pad. For the same reasons, between the engagement recesses 19 closer to the periphery of the engaging portion 23 and said periphery there is provided a safety distance (offset) usually comprised between about 1.0 and 3.0 mm.

According to an embodiment of the invention, the cross section of the engagement recesses 19 and correspondingly of the opening of the engagement recesses 19 on the surface 11a can substantially have any shape. However, according to the invention, the preferred shapes for the cross-section are a circular, circular crown-like, rectangular or slot-shaped shape. The aforesaid shapes, combined with a predetermined distribution of the engagement recesses, determines indeed the best results in terms of resistance to detachment of the friction material. In addition, the aforesaid shapes are the optimal choice for the process of manufacturing by coining, owing to the simplicity of the shapes of the punches to be provided.

According to the invention, the engagement recesses 19 having a rectangular or slot-shaped cross-section, i.e. for which it is possible to identify a longitudinal plane of symmetry, can be oriented with their long sides arranged mutually parallel, or according to directions that are mutually non-parallel.

According to the invention, the cross-section of the engagement recesses 19 can be the same for all the engagement recesses 19 obtained in the backing plate 11, or there can be mixed configurations with engagement recesses 19 having different cross-sections. For example, the sections can all have a circular shape, or some engagement recesses can have a circular cross-section, some others a slot-shaped section and further others a rectangular cross-section, etc.

Preferably, according to the invention, all the engagement recesses 19 provided on the front surface 11a of the backing plate 11 are obtained simultaneously in a single coining step, with a single mold and corresponding punch-holding block 119. According to other embodiments, the engagement recesses 19 can be made in a sequence of coining steps, by using a single mold in which the punches are distributed in different areas at which the same band portion arrives in a sequence of advancing steps. In other embodiments there can be provided different molds, each of them being provided with one or more groups of punches, at which the same band portion arrives in a sequence of advancing steps.

According to the invention, the engagement recesses 19 extend inside the material of the plate 11 along a symmetry axis essentially perpendicular to the plane of the front surface 11a. In a preferred embodiment of the invention the depth of the engagement recesses 19 is comprised between 0.3 and 0.6 mm.

Still according to the invention, the side walls of the engagement recesses 19 are preferably inclined towards the outside. The engagement recesses therefore have side walls diverging from the bottom base of the engagement recess, which is inside the material of the backing plate, towards the outside, i.e. towards the opening of the engagement recesses on the front surface 11a of the backing plate. The inclination of the side walls of the engagement recesses 19 is further preferably circumferentially and axially constant, i.e. it does not vary from the base of the engagement recess 19 towards the surface and it does not vary angularly along the periphery of the engagement recess 19 and along whatever depth of the engagement recess 19. The side walls of the engagement recesses 19 are preferably inclined so as to form an angle α comprised between about 60° and 90° with respect to the plane of the front surface 11a of the backing plate 11. Still more preferably, this angle α is comprised between about 75° and 80°. This slight inclination is of advantage for attaining easy and complete penetration, into the engagement recesses 19, of the mixture of friction material which is deposited onto the front surface 11a during the step of manufacturing of the brake pad 13. In addition, the inclination of the walls of the engagement recess is of advantage because it increases the surface which counteracts the tangential forces and to which the friction material is adhered.

According to a particular embodiment of the invention, at least one of the engagement recesses 19 has its bottom base inside the back plate 11, non-parallel to the front surface 11a of the backing plate 11. According to this particular embodiment of the invention, preferably all, or the majority of, the engagement recesses 19 obtained by coining on the backing plate 11, will have a base substantially flat and inclined relative to the front surface 11a of the backing plate 11. Advantageously, the engagement recesses 19 with inclined bottom base are obtained by means of coining punches having an oblique cutting edge. This shape of the cutting edge allows to obtain engagement recesses 19 with less effort. The application of a minor effort during the coining steps results in less energy consumption and therefore in a reduced production cost and in less stress applied to the material of the backing plate during the coining step. According to this embodiment of the invention, the planes on which the bottom bases of the engagement recesses 19 obtained on a backing plate 11 lie can all be parallel to one another. However, it will be possible to provide planes inclined in various ways, either randomly or according to a predetermined order. The inclination of the bottom base can further vary according to the area of the backing plate 11 in which the corresponding engagement recess 19 is obtained. The inclined bottom base allows to obtain two main advantages: on the one hand, there is the possibility of obtaining the maximum depth of the recess compatible with the thickness of the material and on the other hand the force necessary for cutting the recesses is reduced. Thanks to the invention it will be possible to have deeper recesses with a reduced effort. Preferably, the inclination of the bottom base of the recesses is comprised between about 0° and 10° relative to the plane of the front surface of the backing plate.

Figure 6B:
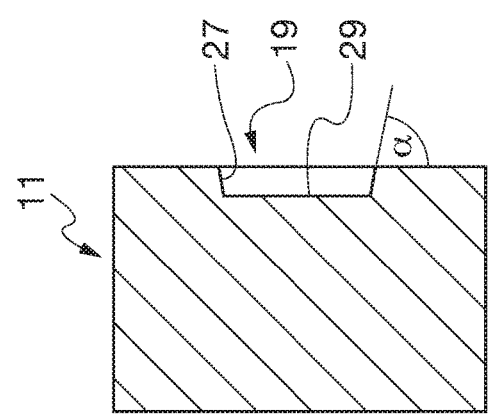
FIG. 6B is a section taken along the line VIB-VIB of FIG. 6A.
Figure 1:
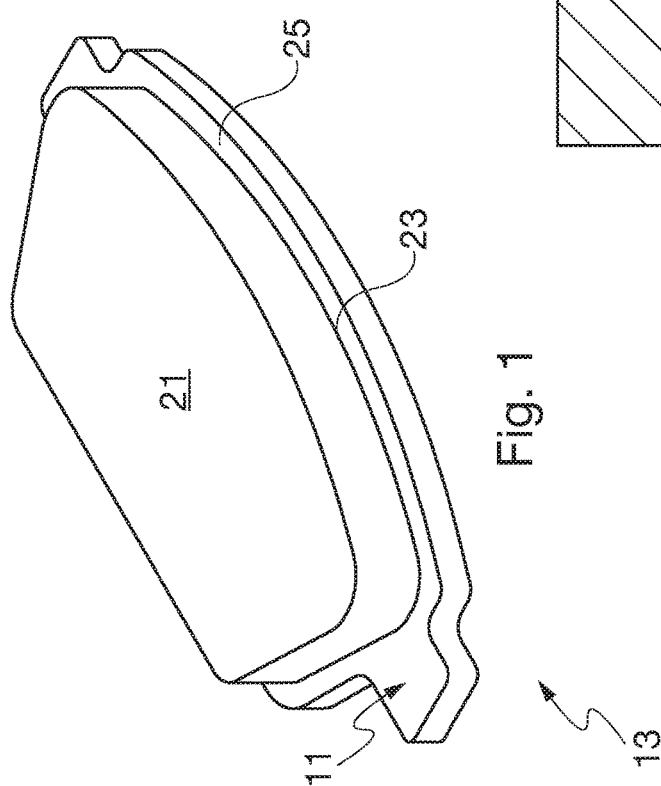
FIG. 1 is a perspective view of a brake pad.
Figure 4:
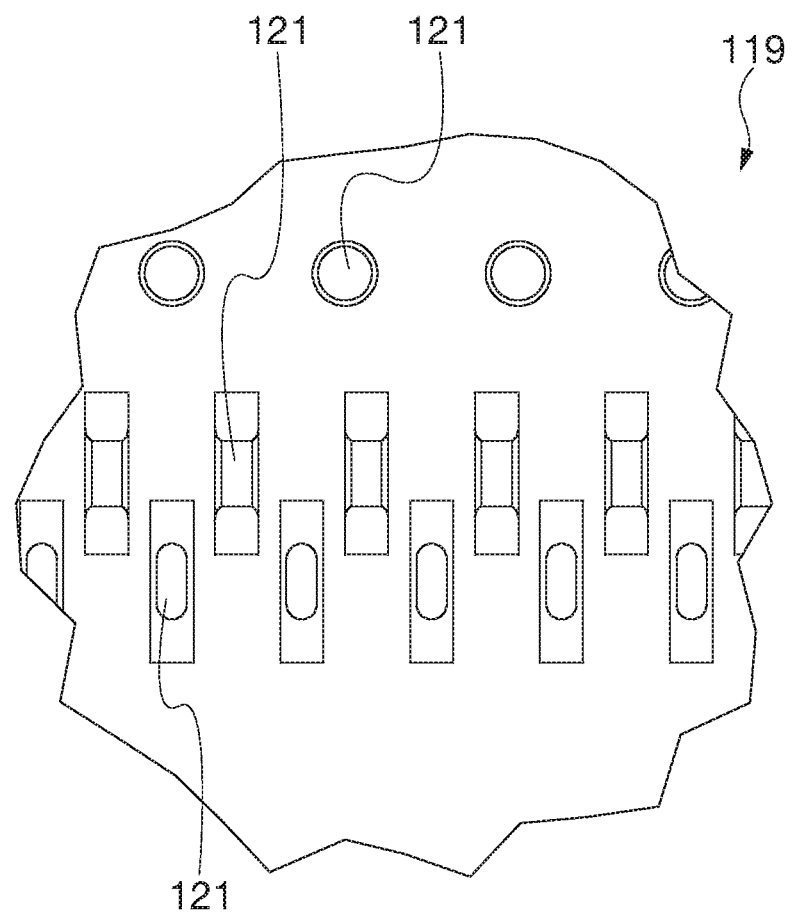
FIG. 4 is a partial enlarged view of the punch-holding block.
Figure 5:
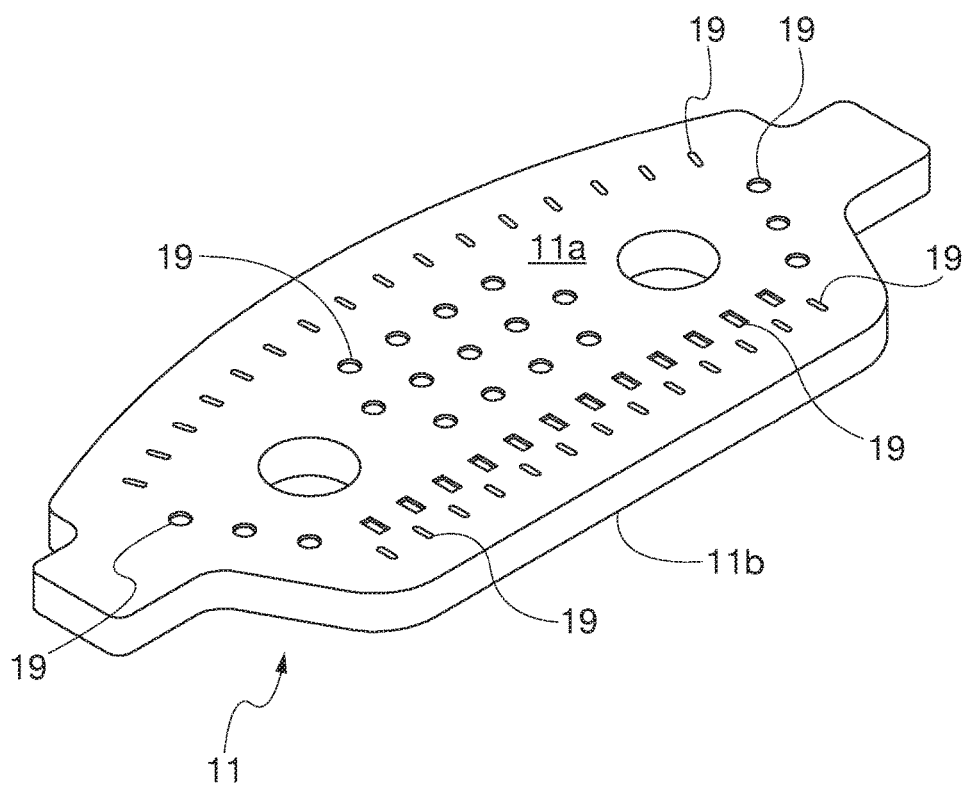
FIG. 5 is a perspective view of a backing plate according to one embodiment of the invention.

Referring to FIGS. 6A e 6B, an embodiment of the invention is illustrated in which the engagement recess 19 ha circular cross-section. In addition, as better visible in FIG. 6B, according to this embodiment the side wall 27 of the engagement recess 19 with circular cross-section is inclined at an angle α with respect to the plane of the surface 11a. In the example shown, the angle α is about 75°. Preferably the diameter at the bottom base 29 of the engagement recess 19 with circular cross-section is comprised between 2.0 and 4.5 mm. In this embodiment the bottom base 29 of the engagement recess 19 is flat and parallel to the front surface 11a of the backing plate 11. However, it will be possible to provide that said bottom base 29 is flat and inclined, for example at about 10°, with respect to the front surface 11a of the backing plate 11.

Referring to FIGS. 7A, 7B an embodiment of the invention is illustrated in which the engagement recess 19 has a circular crown-like cross-section. In addition, as better visible in FIG. 7B, in this embodiment the engagement recess 19 with circular crown-like section comprises a cylindrical outer wall 31 and a cylindrical inner wall 33. The cylindrical inner wall 33 surrounds a cylindrical portion 35 of the backing plate. The portion 35 is inside the engagement recess 19 with circular crown-like cross-section and extends over a length substantially equal to the depth of the engagement recess 19. The cylindrical outer wall 31 of the engagement recess 19 with circular crown-like cross-section is further preferably inclined at an angle α with respect to the plane of the surface 11a. In the example shown, the angle α is about 75°. Preferably the diameter at the bottom base 15 is comprised between 4.0 and 5.5 mm. In this embodiment, too, the bottom base 37 of the engagement recess 19 is flat and parallel to the front surface 11a of the backing plate 11. However, it will be possible to provide that said bottom base 37 is flat and inclined, for example at about 10°, with respect to the front surface 11a of the backing plate 11.

Still with reference to this embodiment, the cross-section of the engagement recess 19 and correspondingly the opening of the engagement recess 19 on the surface 11a, can also have a crown-like shape with its inner and outer perimeter having substantially any shape. According to the invention, the preferred shapes for the crown-like cross-section are circular, square, rectangular or slot-like shapes. According to further embodiments of the invention it will further be possible to provide that the shape of the central portion of the backing plate is different from that of the cross-section of the recess. For example, there can be shapes of the cross-section of the engagement recess in which the outer perimeter defines a circumference and the inner perimeter defines a square and vice versa, or shapes in which the outer perimeter defines a rectangle and the inner perimeter defines a square or vice versa, or shapes in which the outer perimeter defines a slot and the inner perimeter defines a rectangle and vice versa. Other combinations of shapes are also possible.

Figure 8B:
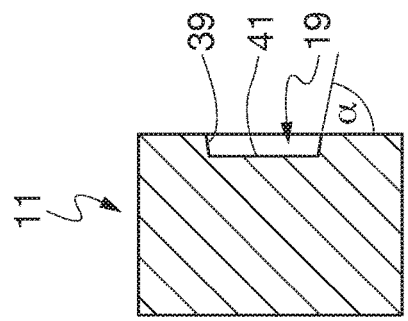
FIG. 8B is a section taken along the line VIIIB-VIIIB di of FIG. 8A.
Figure 8C:
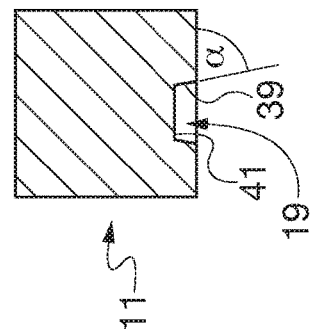
FIG. 8C is a section taken along the line VIIIC-VIIIC of FIG. 8A.
Figure 8A:
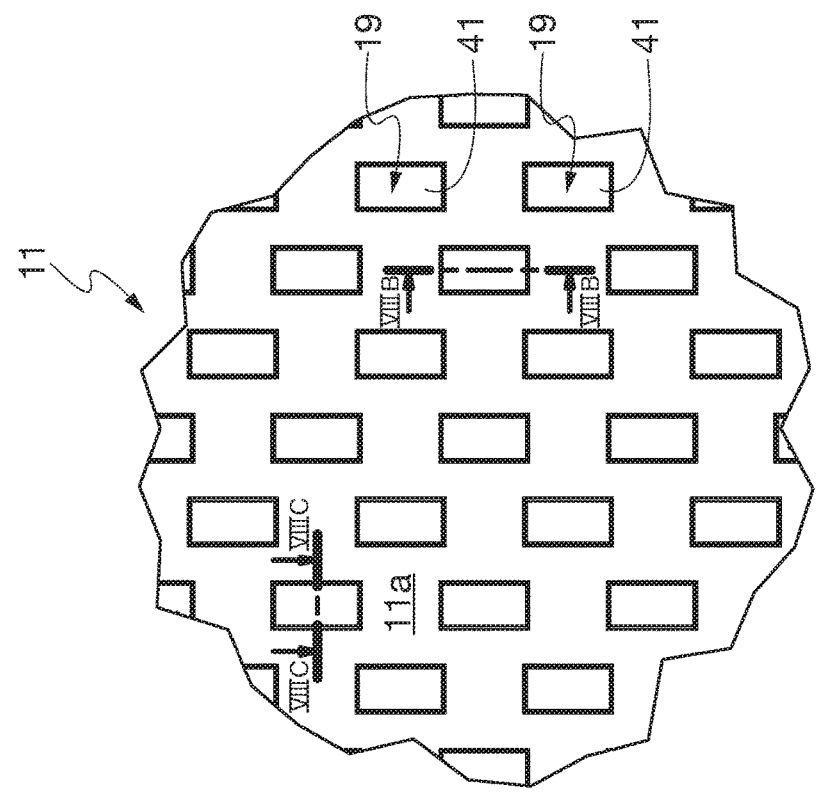
FIG. 8A is a plan view of a backing plate portion provided with rectangular engagement recesses.

Referring to FIGS. 8A, 8B, 8C an embodiment of the invention is illustrated in which the engagement recess 19 has a rectangular cross-section. In addition, as better visible in Figures, in this embodiment the side wall 39 of the engagement recess 19 with rectangular cross-section is inclined at an angle α with respect to the plane of the surface 11a. In the example shown the inclination angle α is about 75°. Preferably the bottom base 41 of the engagement recess 19 with rectangular cross-section has a length comprised between 2.0 and 5.0 mm and a width comprised between 1.0 and 2.0 mm. On the backing plate 11, the engagement recesses 19 with rectangular cross-section can be oriented in different ways, so that their long sides are arranged mutually parallel or inclined in different ways. In this embodiment, too, the bottom base 41 of the engagement recess 19 is flat and parallel to the front surface 11a of the backing plate 11. However, it will be possible to provide that said bottom base 41 is flat and inclined, for example at about 10°, with respect to the front surface 11a of the backing plate 11.

Referring to FIGS. 9A, 9B, 9C, an embodiment of the invention is illustrated in which the engagement recess 19 has a slot-shaped cross-section. The slot-like shape is defined by a substantially rectangular central portion 43a extending longitudinally in two corresponding semicircular portions 43b, 43c. In addition, as better visible in FIGS. 9B e 9C, according to this embodiment the side walls 45 of the engagement recess 19 with slot-shaped cross-section are inclined at an angle α with respect to the plane of the surface 11a. In the example shown the inclination angle is about 75°. The bottom base 47 of the engagement recesses 19 with slot-shaped cross-section will preferably have a length comprised between 2.0 and 5.0 and it will be transversely curved with a curvature radius comprised between about 1.0 and 2.0 mm. In this embodiment, too, the bottom base 47 of the engagement recess 19 is flat and parallel to the front surface 11a of the backing plate 11. However, it will be possible to provide that said bottom base 47 is flat and inclined, for example at about 10°, relative to the front surface 11a of the backing plate 11.

According to a particular embodiment of the invention, the engagement recesses 19 are grouped into matrices or rows on the backing plate 11. The matrices can consist of offset rows or aligned rows. The matrices can be rectangular, square, with circular perimeter, or they can also have other shapes, including irregular ones. The rows of engagement recesses can be single rows or multiple parallel rows, rectilinear or curvilinear or annular and follow a predetermined path, for example parallel to the outer edge of the engaging portion 23. Inside each group of engagement recesses 19, i.e. inside each matrix or row, the engagement recesses can have identical cross-sections or mixed cross-sections, and can be oriented with their sides mutually parallel or inclined relative to one another.

Figure 10A:
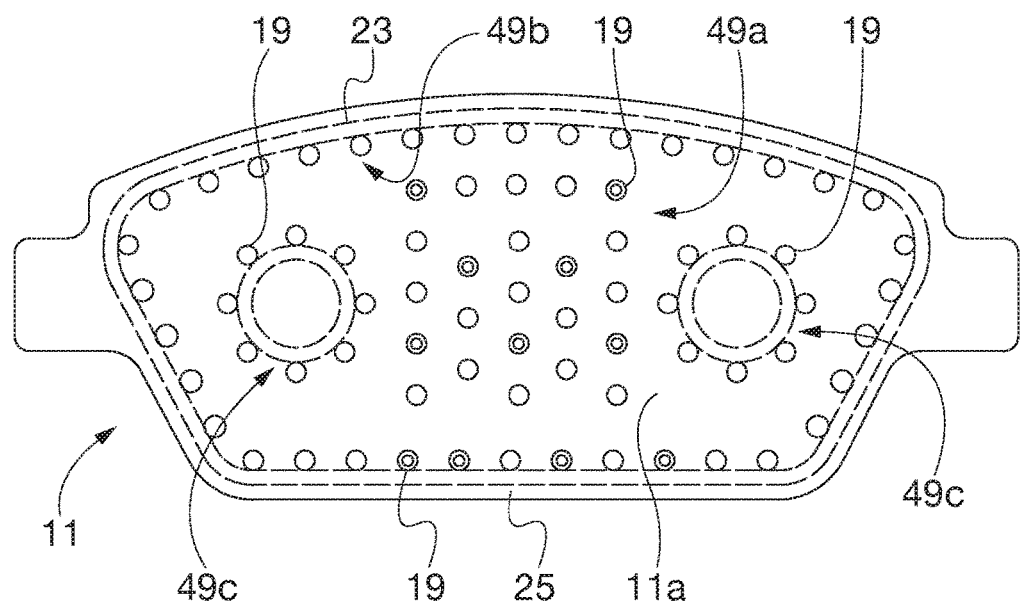

Referring to FIG. 10A, an embodiment of the invention is illustrated in which the engagement recesses 19 are distributed according to a first predetermined design (pattern). The design shown provides for a rectangular matrix 49a of engagement recesses 19 that is arranged at the center of the engaging portion 23, a continuous annular row 49b of engagement recesses 19 arranged at the periphery of the engaging portion 23 and two continuous circular annular rows 49c of engagement recesses 19 arranged at the sides of the matrix 49a in a symmetrical position. The engagement recesses in the embodiment of FIG. 10A have a circular cross-section. In addition, still with reference to this embodiment, some of the recesses 19 of the matrix 49a and of the row 49b have a circular crown-like cross-section. The remaining backing plate portions that do not have the groups of engagement recesses 49a, 49b, 49c have the front surface 11a free of engagement recesses.

Figure 10B:
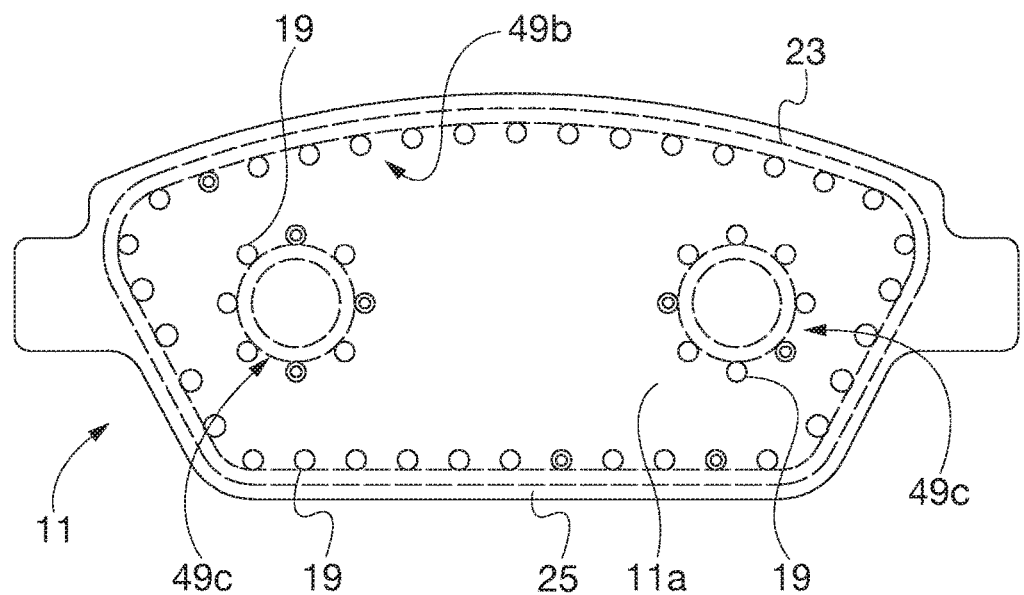

Referring to FIG. 10B, an embodiment of the invention is illustrated in which the engagement recesses 19 are distributed according to a second predetermined design (pattern). The design (pattern) shown differs from that of FIG. 10A in that it does not have the matrix 49a. The engagement recesses 19 in the embodiment of FIG. 10B, too, have a circular cross-section and in addition there are some recesses 19 having a circular crown-like cross-section.

Figure 10C:
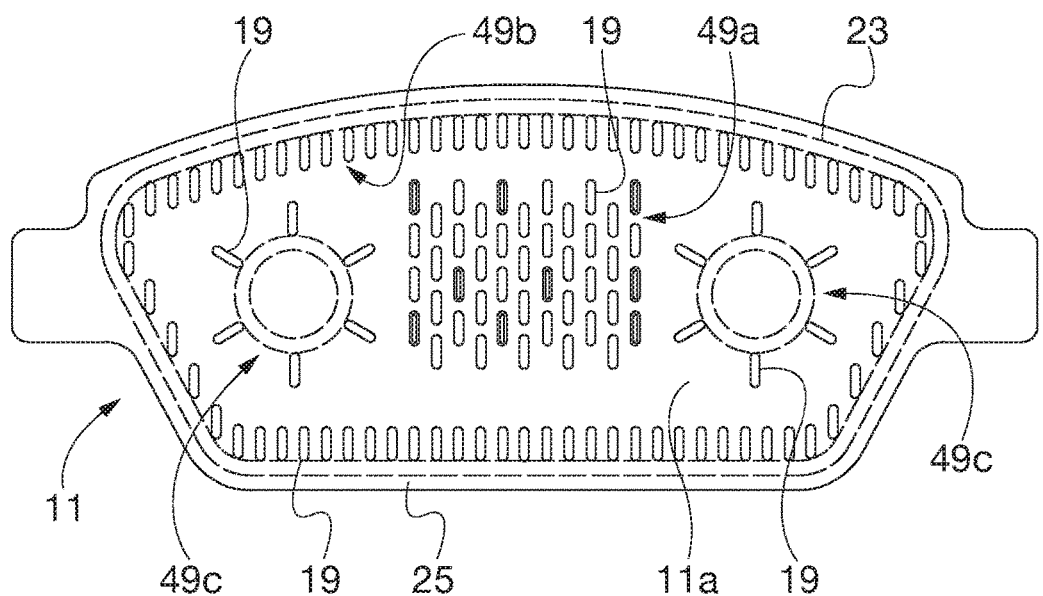

Referring to FIG. 10C, an embodiment of the invention is shown in which the engagement recesses 19 are distributed according to a third predetermined design (pattern). The engagement recesses 19 in the embodiment of FIG. 10C differ from those of FIG. 10A in that they have a slot-shaped cross-section. According to the invention, the slot-shaped engagement recesses 19 can be oriented so that at least two of them are mutually non-parallel. In this way it will advantageously possible to arrange the slots in a sunburst pattern, like in the annular rows 49c of FIG. 11C. This arrangement is allowed by the fact that the engagement recesses 19 are made by coining, i.e. by means of punches 121 hitting the surface 11a of the backing plate 11 perpendicularly, and not by movable blades cutting the surface of the backing plate tangentially. As illustrated, some of the recesses 19 can further have a crown-like cross-section. The remaining backing plate portions that do not have the groups of engagement recesses have the front surface 11a free of engagement recesses.

Figure 10D:
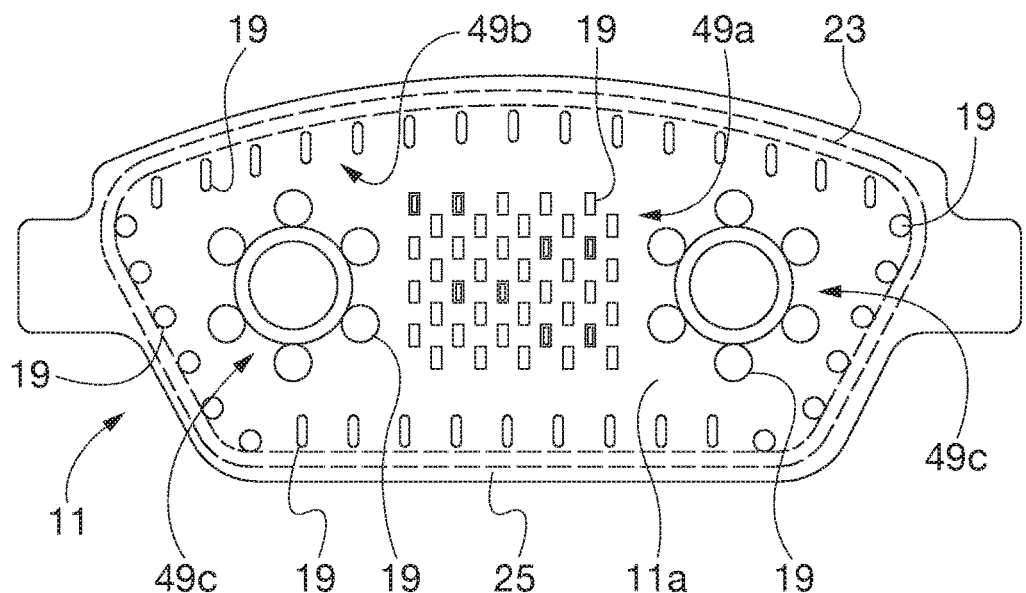

Referring to FIG. 10D, an embodiment of the invention is illustrated in which the engagement recesses 19 are distributed according to a fourth predetermined design (pattern). The design (pattern) shown differs from that of FIG. 11A in that the engagement recesses 19 have mixed cross-sections. In particular, the recesses of the matrix 49a have a rectangular cross-section, the recesses of the row 49b have a slot-shaped cross-section on the longitudinal sides of the backing plate and a circular cross-section on the transverse sides and the engagement recesses 19 of the rows 49c have a circular cross section.

Referring to FIG. 10E, an embodiment of the invention is illustrated in which the engagement recesses 19 are distributed according to a fifth predetermined design (pattern). The design shown provides for a matrix 51a of engagement recesses 19 arranged at the center of the engaging portion 23, a row 51b of engagement recesses 19 arranged along a first longitudinal side of the portion 23, two parallel rows 51c, 51d of engagement recesses 19 arranged along a second longitudinal side of the portion 23 opposite to the first side, a row 51e for each transverse side of the portion 23. In the embodiment of FIG. 10E the engagement recesses 19 have mixed cross-sections. In particular, the engagement recesses of the matrix 51a have a circular cross-section, the engagement recesses of the rows 51b, 51c have a slot-shaped cross-section, the engagement recesses of the row 51d have a rectangular cross-section and the engagement recesses of the rows 51e have a circular cross-section. The remaining backing plate portions that do not have the groups of engagement recesses 51a, 51b, 51c, 51d have the front surface 11a free of engagement recesses. As illustrated, some of the recesses can also have a crown-like section.

Referring to FIGS. 11A to 11D, an embodiment is illustrated in which the engagement recesses 19 have their bottom base 53 inclined. The embodiment shown comprises engagement recesses 19 with rectangular cross-section. However, it will be possible to provide an inclined bottom base for any shape of the engagement recess 19. In the embodiment illustrated, the bases 53 of the engagement recesses 19 adjacent to the transverse side of the backing plate 11 are inclined towards the center of the backing plate (FIGS. 11B, 11C). At the center of the backing plate 11 there is further arranged a matrix 55 of engagement recesses 19 with bases inclined in opposite directions alternately to one another (FIG. 11D). This arrangement is particularly effective when it is desired to confer to the brake pad a behavior substantially independent of the direction of application of tangential forces. In other cases it is possible to provide that all or the majority of the engagement recesses have their bases inclined towards the same side. According to this last arrangement, the brake pad thus obtained has a resistance to detachment of the friction material that in one direction is higher than in the opposite direction. The wall of the recesses that most counteracts the detachment of friction material is the wall having the greatest depth. By adequately orienting the inclination of the bottom bases of the engagement recesses 19 is therefore possible to confer the necessary resistance to detachment in all directions or only in the desired direction(s).

Several variants and modifications falling within the same inventive principle are possible for the invention as described and illustrated.

The invention claimed is:

1. A method of producing backing plates for brake pads, comprising the steps of:
    providing an elongate band of a material suitable for making backing plates;
    sequentially advancing the band stepwise in a forward direction through a mold, the mold having a coining mold portion and a blanking mold portion, the coining mold portion being upstream of the blanking mold portion relative to the forward direction in which the band is fed through the mold; and
    after each stepwise advancement of the band during said advancing step, coining a portion of the band in the coining mold portion corresponding to a single backing plate and simultaneously blanking a previously-coined portion of the band having advanced forward to the blanking mold portion to sequentially produce a coined backing plate from the band before a next stepwise advancement of the band;
    wherein, during said coining, a set of spaced-apart recesses are punched in a predetermined pattern into a smooth surface of the band, and wherein, during said blanking, the coined backing plate is separated from the band such that an entire set of spaced-apart recesses formed during a previous coining step is contained on a smooth front surface of the coined backing plate.

2. The method according to claim 1, wherein the mold includes an intermediate pre-blanking mold portion located between said coining mold portion and said blanking mold portion, and simultaneous with said coining and blanking of the band, a portion of the band is subjected to pre-blanking in said intermediate pre-blanking mold portion.

3. The method according to claim 1, wherein the mold includes an intermediate guiding hole mold portion located between said coining mold portion and said blanking mold portion, and simultaneous with said coining and blanking of the band, at least one guide hole is formed in the band in said intermediate guiding hole mold portion.

4. The method according to claim 1, wherein said coining generates recesses having a circular, circular crown-like, rectangular or slot-shaped cross-section or a combination of said cross-sections.

5. The method according to claim 1, wherein said coining generates a group of recesses having a rectangular or slot-shaped cross-section and wherein at least two of said recesses are oriented according to mutually non-parallel directions.

6. The method according to claim 1, wherein the recesses extend inside the material of the backing plate along a symmetry axis essentially perpendicular to a plane of a front surface of the backing plate and wherein side walls of the recesses are outwardly inclined relative to the front surface.

7. The method according to claim 6, wherein inclination of the side walls of the recesses are circumferentially and axially constant, such that the inclination does not vary from a bottom base of each of the recesses to the front surface and does not vary angularly along a perimeter of each of the recesses and at any depth of each of the recesses.

8. The method according to claim 6, wherein the side walls of the recesses are inclined so as to form an angle α between about 60° and 90° with respect to the plane of the front surface of the backing plate.

9. The method according to claim 6, wherein the recesses have bottom bases from which the side walls of the recesses diverge, and wherein the bottom bases are inclined relative to the front surface of the backing plate.

10. The method according to claim 9, wherein the bottom bases of at least some of the recesses are inclined in a direction opposite to that of the bottom bases of at least others of the recesses.

* * * * *